US006663005B2

(12) United States Patent
Tischer

(10) Patent No.: US 6,663,005 B2
(45) Date of Patent: Dec. 16, 2003

(54) IDENTIFICATION MEANS FOR CHECKING AND/OR FOR ACCESS AUTHORIZATION OF PERSONS

(75) Inventor: Heinz Tischer, Bochum (DE)

(73) Assignee: Rinke Etiketten Karl Rinke GmbH & Co. KG, Sprockhövel (DE)

( * ) Notice: Subject to any disclaimer, the term of this patent is extended or adjusted under 35 U.S.C. 154(b) by 0 days.

(21) Appl. No.: 10/279,641

(22) Filed: Oct. 24, 2002

(65) Prior Publication Data

US 2003/0080549 A1 May 1, 2003

(30) Foreign Application Priority Data

Oct. 26, 2001 (DE) ........................................ 101 53 004

(51) Int. Cl.[7] .................................................. G06K 7/10
(52) U.S. Cl. ................................... 235/462.01; 235/494
(58) Field of Search ............................ 235/462.01, 375, 235/380, 472.01, 494, 454, 382, 382.5

(56) References Cited

U.S. PATENT DOCUMENTS

| | | | | |
|---|---|---|---|---|
| 4,880,256 A | | 11/1989 | Ferre-Blanquez | |
| 5,362,554 A | * | 11/1994 | Holzer et al. | 442/73 |
| 6,059,391 A | * | 5/2000 | Fulkerson et al. | 347/2 |
| 6,068,895 A | | 5/2000 | Kimura | |
| 6,123,117 A | | 9/2000 | Borellini | |
| 2003/0080549 A1 | * | 5/2003 | Tischer | 283/75 |

FOREIGN PATENT DOCUMENTS

| | | |
|---|---|---|
| DE | 3627315 | 2/1987 |
| DE | 3644786 | 7/1988 |
| DE | 695 15 221 T2 | 9/2000 |
| EP | 0919650 | 6/1999 |
| JP | 083 28 474 A | 12/1996 |
| JP | 2000334862 A | 12/2000 |
| WO | 9840856 | 9/1998 |

* cited by examiner

*Primary Examiner*—Thien M. Le
(74) *Attorney, Agent, or Firm*—Friedrich Kueffner

(57) ABSTRACT

An identification unit for checking and/or access authorization of a person includes a representation of the person and of personal data as visually readable alphanumeric data and/or machine readable codes. The identification unit includes a unitary woven product of at least two woven sections, wherein a first woven section includes a specific woven image for visually representing the person, wherein a thread pattern on a visible side of the first woven section simultaneously has a code function which may be machine readable. A second woven section includes at least one of a woven text and woven code with data which relate to the person and/or determine a validity range of the identification units.

17 Claims, 3 Drawing Sheets

IDENTIFICATION MEANS FOR CHECKING AND/OR FOR ACCESS AUTHORIZATION OF PERSONS

BACKGROUND OF THE INVENTION

1. Field of the Invention

The present invention relates to an identification means for checking and/or for access authorization of persons, wherein the identification means includes a representation of the person as well as personal data provided in the form of visually readable alphanumeric data and/or machine readable codes.

2. Description of the Related Art

It may be of great security interest to permit access to certain areas of public or private life only to certain persons. Used for this purpose are identification means which identify the authorized person at least in two ways. First, representations are used on the identification means which make it possible to unmistakably recognize the face of the authorized person. In addition, all essential personal data are provided on the identification means. These data usually are alphanumeric data which can easily be visually read. However, it is advantageous to provide these data or other data on the identification means in the form of codes which are machine readable. To make the identification means clearly recognizable, it is visibly attached to the article of textile clothing of the person, preferably in the chest area.

An identification means known in the art is composed of a badge which contains, in addition to an integrated photograph of the authorized person, also the personal data of the person. This known identification means was used either as a tag or a brooch attached to the article of clothing of the authorized person. The data provided on the identification means could also include machine readable codes. Reading the identification means by machines not only served to identify the respective person but could also be used in appropriate cases like a key for facilitating access authorization for the person to certain protected areas.

In the known identification means, there is the danger of manipulation. Unauthorized persons could more or less easily alter or exchange the photograph of the identification means. The code applied to the identification means could then also provide access for unauthorized persons. The code could be falsified. The known identification means of this type is an annoying object on the article of clothing which makes the article of clothing uncomfortable to wear. The manner in which the known identification means was fastened required that there was a releasable connection between the article of clothing and the identification means, so that the identification means could be lost or stolen when used.

It is known in the art to weave a code pattern in the form of strips having a defined width and a certain strip spacing into a weaved label band by means of a code waft thread, as disclosed in EP 0 919 650 A1. To prevent copying of the label band, the code waft thread was woven over the entire band width into the basic fabric of the label band and was manufactured from a material which under visible light is identical to the basic waft threads. The code pattern only became visible when viewed under the light of radiation which is outside of the visible range.

It is known to use modern weaving machines which make it possible to transpose photographs of objects or persons by weaving technology in such a way that a woven image of the photograph could be produced by means of so called Jacquard looms. These machines did not provide for coding.

SUMMARY OF THE INVENTION

Therefore, it is the primary object of the present invention to develop a comfortable identification means which provides higher security.

In accordance with the present invention, the identification means is a unitary woven product having at least two woven sections, wherein the first section is provided with a specific woven image which is a visual representation of the person and whose visible thread configuration simultaneously has a code function which may also be machine readable, and wherein a second section is provided with a woven text and/or woven code with data which relate to the person and/or determine the area of validity of the identification means.

Accordingly, the woven image which is a representation of the person simultaneously has a code function. The woven image is produced using modern weaving technology from a photograph of the person, however, this photograph, controlled by a computer, is transposed into a certain weaving technology. This weaving technology ensures that a certain specific thread configuration appears on the visible side of the woven product which is easily machine readable. This provides the woven image simultaneously with a code function which is not visible to the viewer of the woven image. This significantly increases the prevention of copying of the identification means according to the present invention. By manufacturing the identification means by weaving technology there is a permanent relationship between the representation of the person, on the one hand, and the personal data of the person, on the other hand. Thus, by including the personal data, a unitary woven product is obtained which acts as an identification means.

Basically, the entire woven image may serve as "code", wherein all weave points contribute to the code function. Of course, it is also possible to use only certain areas of the woven image for determining the code. The exchange of woven images in the unitary woven product according to the present invention is already very difficult and prevents copying. However, the above-mentioned code function of the woven image increases the safety against copying by a multiple. Even if it were possible to exchange a woven image, it is certain that the code functions of these two woven images are different and the differences are immediately recognized when machine reading the images. It has been found in practice that even woven images of the same person under the same conditions result in weave patterns which are different at least over areas or points which is immediately recognizable when machine reading the woven images. This is because two photographs made of the same person one after the other are never identical; this is of course especially true for the photograph of an unauthorized person.

The safety against copying can be even further increased if the predetermined code function in the woven image, on the one hand, is interconnected with the content of the weaving code, on the other hand. When the code informations of these two elements are read together, the identification means will only be successful as an access authorization when the interconnection of these two codes coincides. If the reading unit does not recognize that the codes coincide, the access authorization is denied.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
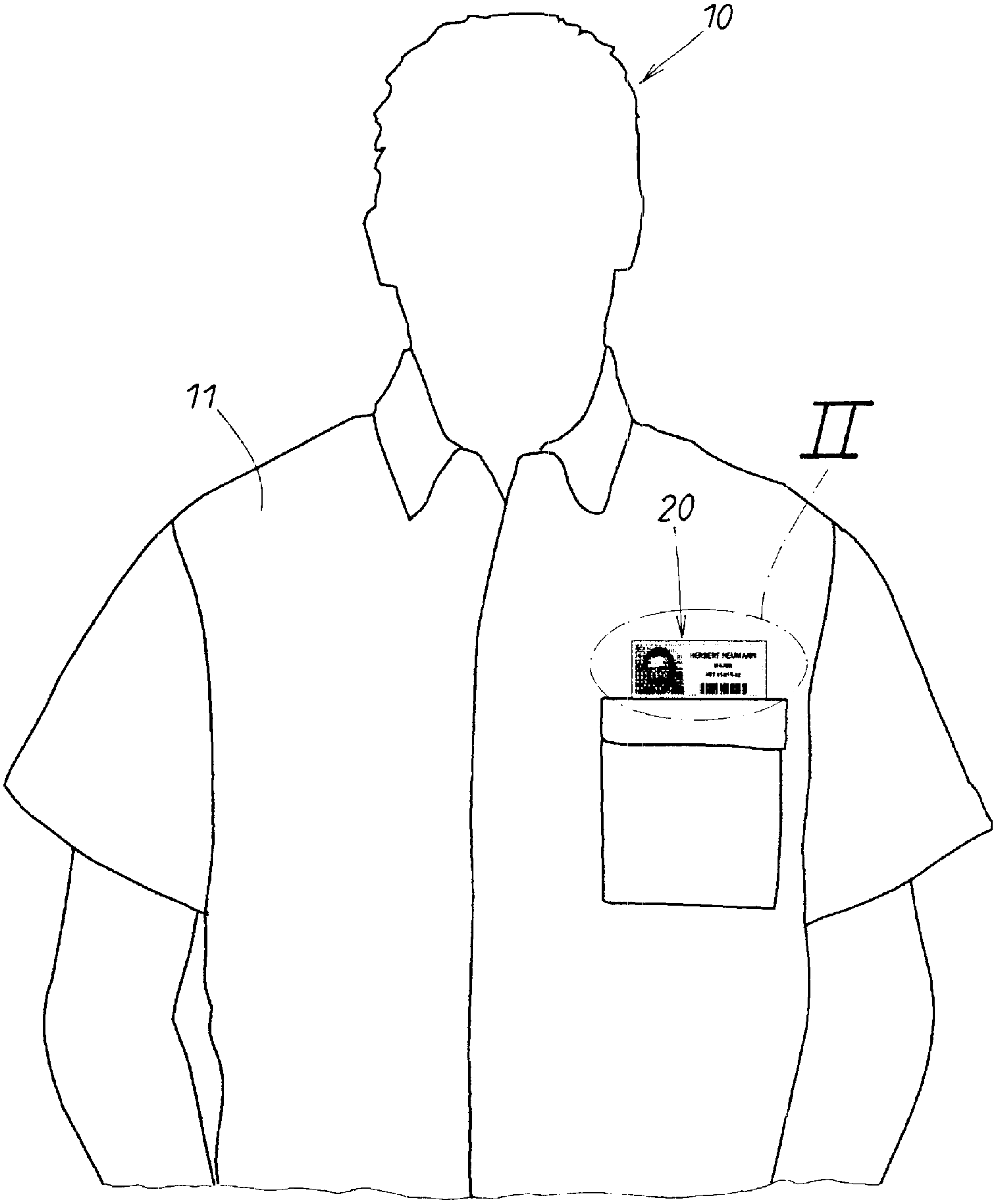
FIG. 1 is a front view of an authorized person who wears the woven product according to the present invention on an article of clothing.

The identification means according to the present invention is composed of a special woven product 20 and, as seen in FIG. 1, is attached by an authorized person 10 on an article of clothing 11 so as to be clearly visible.

Figure 2:
FIG. 2 is an enlarged view of detail II of FIG. 1.

As can be seen in FIG. 2, the woven product 20 includes a basic fabric 23 which is attached to the article of clothing 11 by means of a thread 12. The fastening means may be of a type which are destroyed when it is attempted to remove it from the woven product. It is advantageous to use a safety thread which may also contain a coding. Other types of fastening are also possible, such as gluing or fastening by pins.

Figure 3:
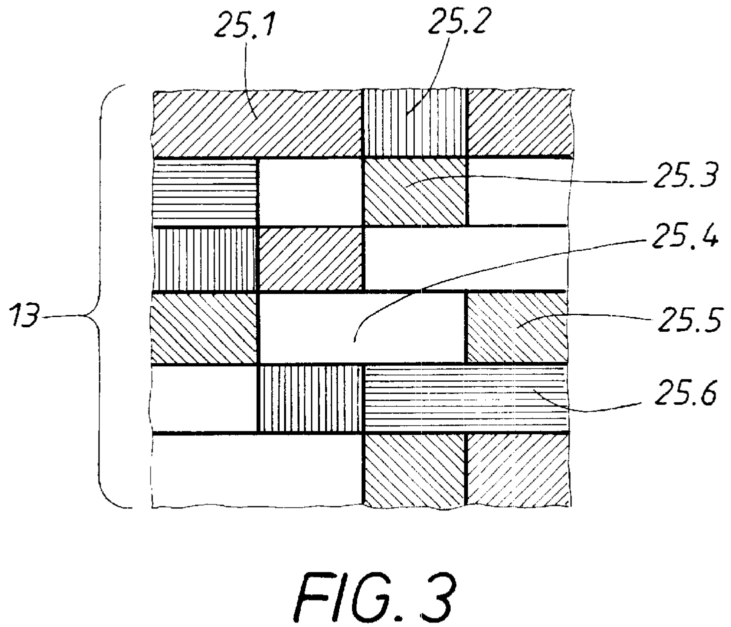
FIG. 3 is a schematic view, on a much larger scale, of a portion of the woven image of FIG. 2.

The woven product 20 includes two woven sections 21, 22 which are woven in the same weaving process. The first woven section 21 includes a specific woven image 24 which is a visual representation of the person to be identified. As illustrated in FIG. 3 on a much larger scale, this is effected by weave points between the warp threads and waft threads which produce the woven product and which may be present in different materials and/or colors. This produces on the visible side weave points 25.1 through 25.6 in different colors which is illustrated in FIG. 3 by different hatchings or by no hatching. In the present case, the woven image is formed of six colors of a figure waft. The thread configuration at the various points of the woven image acts, through the given location of the weave points 25.1 through 25.6, as a first code function 13 which is machine readable in the case of a check by a first reading device 14. The decoding result is supplied to an evaluating device 15.

The woven product 20 has in the second woven section 22 a visually readable woven text 26 as well as a machine readable woven code 27 which represents the corresponding personal data of the authorized person 10. The woven code 27 may also be woven into the fabric as a visually readable number 28 and may contain additional data.

Figure 4:
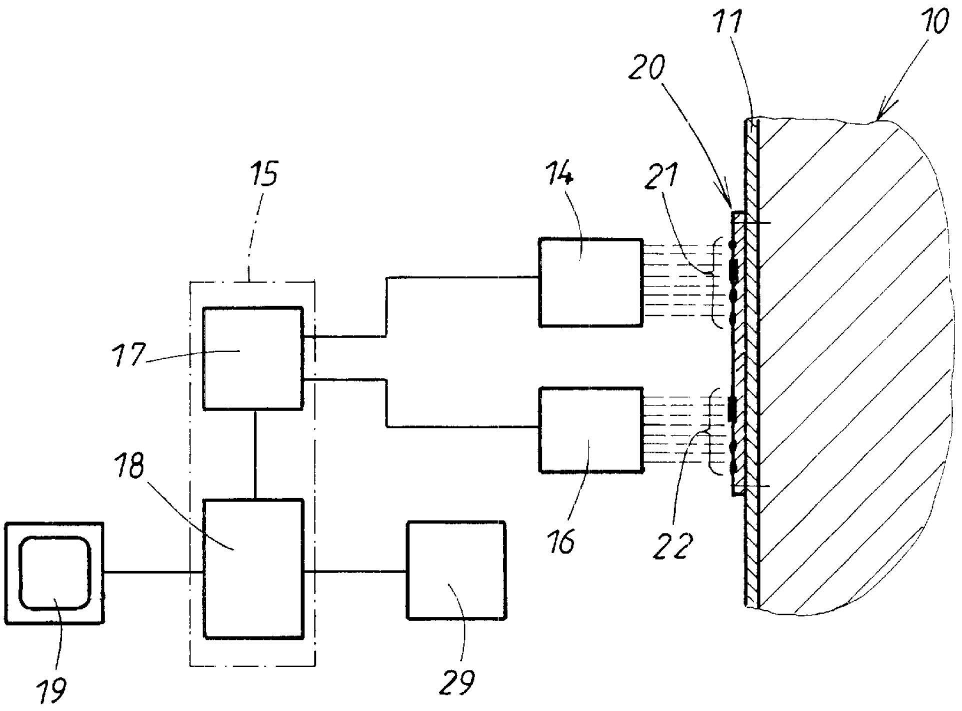
FIG. 4 is a schematic illustration showing the use of the woven product at a checking station.

As illustrated in FIG. 4, this second woven section 22 can be read by another reading device 16 and the result can be supplied by the evaluating device 15. As further illustrated in FIG. 4, the two devices 14, 16 are initially connected to a comparator 17 of the evaluating device 15 which compares the results of the two woven sections 21, on the one hand, and 22, on the other hand. A specific interconnection of these two codes 13, 27 is stored in the evaluating device. When the comparator 17 determines that the codes coincide or the stored defined interconnection exists, the comparator 17 supplies the information to the work unit 18 and the work unit 18 supplies the information either to a monitor 19 or an alarm unit 29, or to other evaluating means.

In addition to or instead of the code function of the entire woven image, it is also possible that some of the weave points or weave areas of the woven image 24 identified in FIG. 2 by 31 through 34 have their own code content 30 which is machine readable. This code content 30, in turn, may be interconnected by assigning it to the woven code 27. If the code content is limited, both codes 27, 30 may even be identical.

In the illustrated embodiment, the woven code 27 is formed by being different with respect to color or weave pattern as compared to the basic fabric 23 of the woven product 20. However, it is also possible to carry out the weaving technology for the woven code 27 by means of threads which are components of the basic weave pattern and, therefore, cannot be recognized from the outside with respect to color or weave pattern. Such special threads become visible only under special light conditions, for example, by using ultraviolet light which excites these threads to fluorescence. In this manner, uninformed persons will not be able to recognize what the woven code identifies or even whether a woven code is provided on the woven product 20.

For further increasing the safety of the woven product 20, it would also be possible to produce the woven code 27 by weaving technology with a special code thread. Finally, it would also be possible to connect electronic data carriers to the woven product 20, wherein the data carriers can be read already from a distance. For example, so called transponders are suitable for this purpose. In this case, it is advisable to produce the woven product at least over areas thereof as a double fabric, so that a pocket is created. Such a data carrier can then be arranged in the pocket.

Instead of using weaving technology, it would also be possible to produce the textile product by a knitting process. In that case, the same advantages and effects are achieved as in the embodiment described above.

While specific embodiments of the invention have been shown and described in detail to illustrate the inventive principles, it will be understood that the invention may be embodied otherwise without departing from such principles.

I claim:

1. An identification means for checking and/or access authorization of a person, the identification means comprising a representation of the person and of personal data as visually readable alphanumeric data and/or machine readable codes, the identification means comprising a unitary woven product of at least two woven sections, wherein a first woven section comprises a specific woven image for visually representing the person, and wherein a thread pattern on a visible side of the first woven section simultaneously has a code function which may be machine readable, and wherein a second woven section comprises at least one of a woven text and woven code with data which relate to the person and/or determine a validity range of the identification means.

2. The identification means according to claim 1, wherein the first woven section is comprised of warp threads or waft threads which differ from each other with respect to color or material, wherein, in dependence on an individual weave cartridge determining the weaving process, at least one defined thread appears on the visible side at each weave point and produces the woven image, and wherein the individual weave cartridge simultaneously contains the code function and the weaving result of the cartridge is machine readable in the woven product.

3. The identification means according to claim 1, wherein the code function in the woven image is interconnected with a content of the weaving code, and wherein both code informations are readable together and a positive identification is effected when both code informations coincide.

4. The identification means according to claim 1, wherein at least some weave points in the woven image have a separate code content which is machine readable.

5. The identification means according to claim 4, wherein the code content in the woven image is identical to the woven code content.

6. The identification means according to claim 1, wherein the woven code is a bar code.

7. The identification means according to claim 1, wherein the woven code is a component of a basic weave pattern of the woven product and is not recognizable visually with respect to color or weave pattern under normal light conditions, and wherein the woven code is at least machine readable under special light conditions.

8. The identification means according to claim 7, wherein the special light conditions are comprised of fluorescent light.

9. The identification means according to claim 1, wherein the web code is comprised of a special code thread which is woven into the woven product.

10. The identification means according to claim 1, comprising an electronic data carrier capable of being readable from a distance integrated in the woven product.

11. The identification means according to claim 10, wherein the woven product is at least over parts thereof comprised of a double fabric and forms a pocket, wherein the electronic data carrier is arranged in the pocket.

12. The identification means according to claim 1, comprising fastening means adapted for fastening the woven product to a textile object.

13. The identification means according to claim 12, wherein the woven product is integrated in an article of clothing.

14. The identification means according to claim 13, wherein the fastening means and/or the woven product are destroyed when the woven product is removed from the article of clothing.

15. The article of clothing according to claim 12, wherein the woven product or the fastening means therefor comprises a safety thread.

16. The identification means according to claim 13, wherein the woven product is adapted to be connected by sewing threads to the article of clothing of the person.

17. An identification means for checking and/or access authorization of a person, the identification means comprising a representation of the person and of personal data as visually readable alphanumeric data and/or machine readable codes, the identification means comprising a unitary knitted product of at least two knitted sections, wherein a first knitted section comprises a specific knitted image for visually representing the person, and wherein a thread pattern on a visible side of the first knitted section simultaneously has a code function which may be machine readable, and wherein a second knitted section comprises at least one of a knitted text and knitted code with data which relate to the person and/or determine a validity range of the identification means.

* * * * *